US011550150B2

(12) United States Patent
O'Connell et al.

(10) Patent No.: US 11,550,150 B2
(45) Date of Patent: Jan. 10, 2023

(54) HEADS UP DISPLAY HOUSING

(71) Applicant: Panasonic Automotive Systems Company of America, division of Panasonic Corporation of North America, Peachtree City, GA (US)

(72) Inventors: Patrick O'Connell, Novi, MI (US); Edo Omanovic, Livonia, MI (US)

(73) Assignee: Panasonic Automotive Systems Company of America, Division of Panasonic Corporation of North America, Peachtree City, GA (US)

(*) Notice: Subject to any disclaimer, the term of this patent is extended or adjusted under 35 U.S.C. 154(b) by 41 days.

(21) Appl. No.: 16/919,636

(22) Filed: Jul. 2, 2020

(65) Prior Publication Data

US 2021/0003845 A1    Jan. 7, 2021

Related U.S. Application Data

(60) Provisional application No. 62/870,406, filed on Jul. 3, 2019.

(51) Int. Cl.
*G02B 27/01*    (2006.01)
(52) U.S. Cl.
CPC ..... *G02B 27/0149* (2013.01); *G02B 27/0101* (2013.01); *G02B 2027/0159* (2013.01)

(58) Field of Classification Search
CPC ... G02B 27/01–0189; G02B 2027/0105–0198; B60R 2011/0005; B60K 37/02; B60K 37/04
See application file for complete search history.

(56) References Cited

U.S. PATENT DOCUMENTS

| | | | | |
|---|---|---|---|---|
| 5,905,477 A | * | 5/1999 | Kuwayama | G02B 27/0101 345/7 |
| 2004/0140602 A1 | * | 7/2004 | Gerritsen | B25B 5/068 269/6 |
| 2013/0155520 A1 | * | 6/2013 | Shimada | G02B 27/01 359/630 |
| 2015/0043082 A1 | * | 2/2015 | Potakowskyj | G02B 7/005 359/630 |
| 2015/0286054 A1 | * | 10/2015 | Ushida | G02B 27/0149 345/7 |

* cited by examiner

*Primary Examiner* — Christopher A Lamb, II
(74) *Attorney, Agent, or Firm* — Laurence S. Roach, Esq.

(57) ABSTRACT

Examples of the present disclosure relate to a device and system in a vehicle for guiding light towards a user. In an example, the device includes a heads up display (HUD) to guide light towards a user in a vehicle, the HUD. In an example, the device includes a HUD housing with a base plane and a stationary mirror mount on the HUD base. The example can include an adjustable mirror mount on the HUD base and an attachment slot disposed in the HUD housing, the attachment slot to accept a mounting tab, wherein the attachment slot is shaped to accept both of either a predominantly vertical mounting tab or a predominantly horizontal mounting tab.

14 Claims, 6 Drawing Sheets

100

HEADS UP DISPLAY HOUSING

CROSS-REFERENCED TO RELATED APPLICATIONS

This application claims benefit of U.S. Provisional Application No. 62/870,406 filed on Jul. 3, 2019, which the disclosure of which is hereby incorporated by reference in its entirety for all purposes.

FIELD OF THE INVENTION

The present disclosure generally relates to a system and device for guiding light towards a user. More specifically, the present disclosure relates to a heads up display (HUD) housing with attachment slots that allow a large variety of mounting tabs to attach the HUD housing to the vehicle.

BACKGROUND

This section is intended to introduce the reader to various aspects of art, which may be related to various aspects of the present disclosure, which are described and/or claimed below. This discussion is believed to be helpful in providing the reader with background information to facilitate a better understanding of the various aspects of the present disclosure. Accordingly, it can be understood that these statements are to be read in this light, and not as admissions of prior art.

A heads up display (HUD) provides information to a user and can include projecting a virtual image. The virtual image may be projected to appear at a location viewable to a user, such as a driver, where the virtual image can be seen while the user views another area in physical space. In the example of a driver of a vehicle, the HUD may display an image that is viewable as the driver also views the road ahead, thus avoiding the distraction of taking their eyes off road to see information traditionally displayed by cluster and screens on central panel. While the HUD can display images, it can also contain sensors to aid in monitoring the driver and mirrors to adjust the location of the image being displayed.

SUMMARY

Generally, the present techniques relate to a device in a vehicle for guiding light towards a user including a heads up display (HUD) housing with a HUD base. The device may include a stationary mirror mount on the HUD base the HUD housing and an adjustable mirror mount on the HUD base in the HUD housing. The device may include an attachment slot in the HUD housing, the attachment slot to accept a mounting tab, wherein the attachment slot is shaped to accept both of either a predominantly vertical mounting tab or a predominantly horizontal mounting tab.

The present techniques further include a system for use in a vehicle to guide light towards a user including a heads up display (HUD) housing with a HUD base. This example also includes a stationary mirror mount on the HUD base the HUD housing and an adjustable mirror mount on the HUD base in the HUD housing. Further, this example includes an attachment slot in the HUD housing, the attachment slot to accept a mounting tab, wherein the attachment slot is shaped to accept both of either a predominantly vertical mounting tab or a predominantly horizontal mounting tab. The system includes either the predominantly vertical mounting tab or the predominantly horizontal mounting tab.

BRIEF DESCRIPTION OF THE DRAWINGS

The above-mentioned and other features and advantages of the present disclosure, and the manner of attaining them, may become apparent and be better understood by reference to the following description of one example of the disclosure in conjunction with the accompanying drawings, where.

Figure 1:
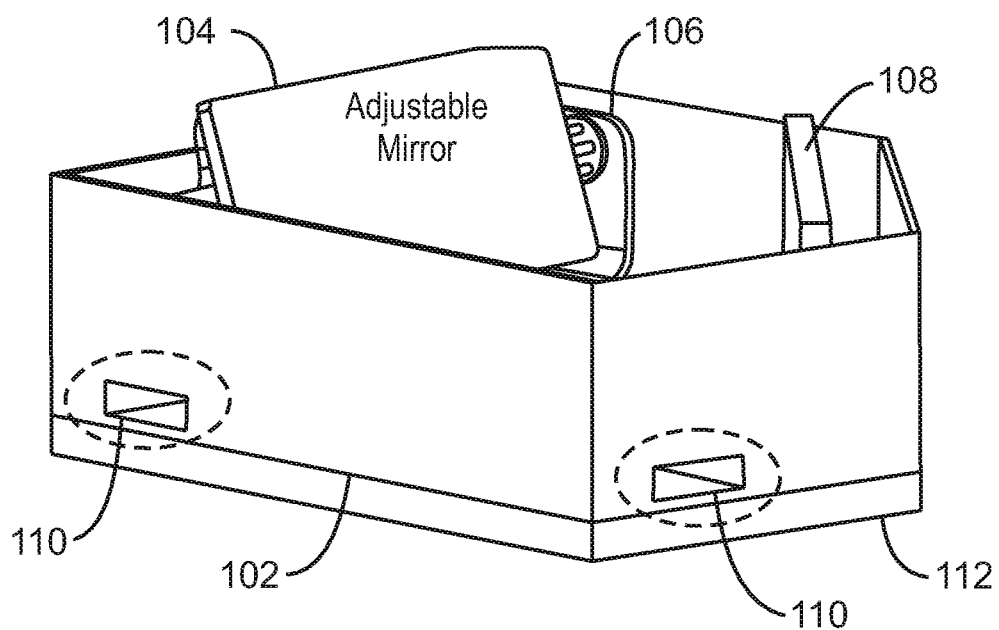
FIG. 1 is a block diagram of an example device for guiding light towards a user.

Correlating reference characters indicate correlating parts throughout the several views. The exemplifications set out herein illustrate examples of the disclosure, in one form, and such exemplifications are not to be construed as limiting in any manner the scope of the disclosure.

DETAILED DESCRIPTION OF EXAMPLES

One or more specific examples of the present disclosure are described below. In an effort to provide a concise description of these examples, not all features of an actual implementation are described in the specification. It can be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it can be appreciated that such a development effort might be complex and time consuming, and is a routine undertaking of design, fabrication, and manufacture for those of ordinary skill having the benefit of this disclosure.

As discussed above, a HUD can provide a virtual image to the driver. In order to correctly place this image and perform other functions, the HUD can include a driver monitoring system (DMS) within the HUD. Based on a determined location of a user, a picture generating unit (PGU) can work in concert with a number of mirrors and the windshield to reflect projected light towards the eyes of the user. While some components of a HUD may vary from vehicle to vehicle, many components are the same across a large number of different types, brands, and shapes of vehicles. For example, many vehicles include a HUD with an adjustable mirror to reflect light towards a windshield and ultimately a user such as a driver. Similarly, many HUDs include at least a second mirror also mounted to the HUD to help reflect light from a PGU to the adjustable mirror. Creating a housing that includes each of these components and can also attach to a wide range of vehicle types and shapes can reduce manufacturing costs as even varied form factors and designs can include a HUD with standard shape across types so long as the attaching portion enables attachment to a wide range of vehicle form factors.

To enable this, an attachment slot or a number of attachment slots are made and shaped to encourage interchangeability of mounting tabs. Previously, HUD components had to be both uniquely placed and installed in each type of vehicle, or a unique HUD housing would have to be designed to house these components for each new vehicle form factor. Both benefits of standardization and customization can exist in the present techniques which create a HUD housing that enables standardization of essential equipment and HUD equipment placement while still allowing customized attachment tabs to allow installation in multiple types of vehicle or form factor.

FIG. 1 is a block diagram of an example device for guiding light towards a user 100. The block diagram omits many features while also showing example versions of some elements for clarity of explanation.

The device 100 can include a heads up display (HUD) housing 102 which includes a base as well as walls coming up from the base with an open top. In an example the walls of the HUD housing 102 are opaque. The top may be open either physically by their being no structure on the top of the HUD housing 102 or optically open such that visible light may pass through it. In an example, the top of the HUD housing 102 may provide a mount for a lens through which visible light may pass.

The HUD housing 102 may include an adjustable mirror mount 106 configured to receive an adjustable mirror 104 and enable adjustment of the adjustable mirror 104. In an example, the adjustable mirror 104 may be flat or concave. The adjustable mirror 104 may be physically moved by the adjustable mirror mount 106 to adjust the angle or physical location of the adjustable mirror 104. The HUD housing 102 may also include a stationary mirror 108 that reflects light from and to the adjustable mirror 104. In an example, the HUD includes a picture generating unit (PGU) that is located beneath the adjustable mirror and projects images towards the user by using the mirrors and the windshield to guide the images towards the user. The light for an image leaving the PGU may first arrive at the stationary mirror 108 before being reflected towards the adjustable mirror 104 which reflects the light towards a windshield, where the light is then reflects towards the user. Movement and the location of the user may be detected by sensors located in the HUD housing 102. In response to detected movement of the user, the adjustable mirror 104 may be adjusted in angle and location in order to ensure the light projected from the HUD reaches the user.

The HUD housing 102 also includes at least one attachment slot 110 or a number of attachment slots 110. In some examples, the attachment slot 110 may create an opening all the way through the width of the HUD housing wall 102. In an example, the attachment slot 110 may create a partial opening which does not go all the way through the width of the wall of the HUD housing 102. The attachment slot 110 can be rectangular as shown or substantially rectangular with one or more rounded corners. The attachment slot 110 may be a number of shapes to enable the insertion of a mounting tab. The attachment slot 110 may be a shape that accepts more than one type of mounting tab to enable the ability for the HUD housing 102 to be mounted in a variety of different contexts. The attachment slot 110 may be shaped to match a universal mounting tab engaging end. In an example where mounting tabs have different shapes for engaging the HUD housing 102, the attachment slot may be shaped to create an opening with a shape that matches the superposition of the two or more mounting tab shapes. An attachment slot that is a superposition of the two or more mounting tab shapes will have at least a portion of the attachment slot engaging an inserted mounting tab and another portion of the attachment slot that is not engaging the inserted mounting tab.

Figure 2:
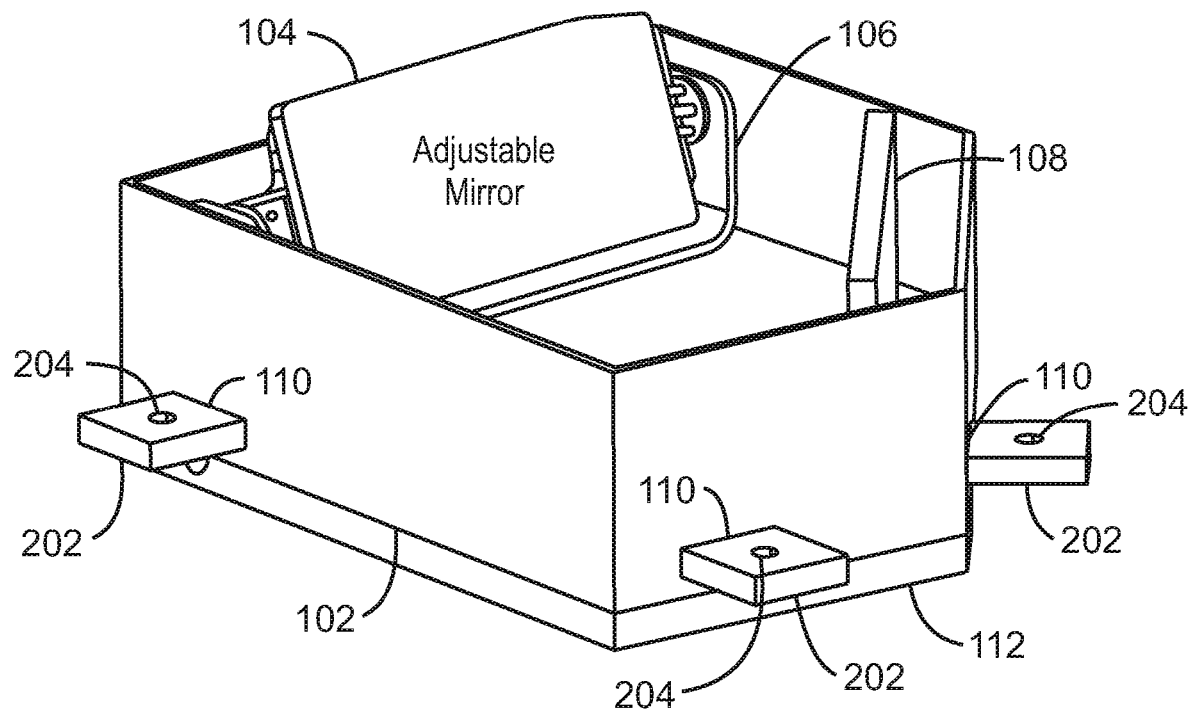
FIG. 2 is a block diagram of an example system for guiding light towards a user with a first set of mounting tabs.

FIG. 2 is a block diagram of an example system for guiding light towards a user with a first set of mounting tabs 200. Like numbered items are as described above with respect to FIG. 1.

The HUD housing 102 includes at least one attachment slot 110 to accept a mounting tab 202. The mounting tab 202 when inserted into the attachment slot 110 may engage with the HUD housing 102. The mounting tab 202 may include a fastener opening 204 that can allow a fastener to be inserted to fasten the mounting tab 204 to the vehicle or a vehicle component. When the mounting tab 202 is fastened to the vehicle, the engagement of the mounting tab 202 to the HUD housing 102 through the attachment slot 110 creates an affixing pressure that holds the HUD housing 102 and its components in place.

When discussing directionality with regard to the HUD housing 102 and its components, the directions top and bottom refer to the relative position of the HUD housing once it is installed in a car. For example, the bottom of the HUD housing 102 may be closer to the wheels of a customary vehicle and the top of the HUD housing 102 may refer to the side of the HUD housing 102 closer to the roof of the vehicle. The HUD housing 102 may include a base which is completely or partially covered by material onto which components can be mounted. The HUD base 112 may be located towards the bottom of the HUD housing 102 and may connect in whole or in part to the walls of the HUD housing 102. In an example, the HUD base 112 is the physical bottom of the HUD housing. The HUD base 112 may create a mathematical plane called a base plane that is defined by an average location of the HUD base 112. This base plane may be perpendicular to the HUD housing walls. In an example, the HUD base 112 may be irregularly shaped, however the median location of points along the HUD base 112 of the HUD housing 102 may create a reference for where the base plane is located.

The HUD housing walls may be relatively vertical as in running from the bottom to the top of the HUD housing. The walls of the HUD housing may span in whole or in part the top to bottom range of the HUD housing 102. The attachment slot 110 may be shaped to create an opening in the HUD housing wall, wherein the opening has edges that are straight into the HUD housing wall and traverse a direction normal or perpendicular to the surface of the HUD housing wall. In an example, the HUD housing wall may be curved in which case the attachment slot may create an edge that is normal to the tangent of that particular point on the HUD housing wall.

Each of the mounting tabs 20 may be a predominantly vertical mounting tab or predominantly horizontal mounting tab. Accordingly, the attachment slot may create an edge in the HUD housing 102 to accommodate both of either a predominantly vertical mounting tab or a predominantly horizontal mounting tab. Some vehicles may include components that necessitate mounting the HUD housing 102 with the predominantly vertical mounting tabs. Other vehicles may necessitate mounting the HUD housing 102 with predominantly horizontal mounting tabs. In an example a vehicle may use a mix of mounting tabs such that the attachment slots 110 should accommodate both of either the predominantly vertical or the predominantly horizontal mounting tabs.

To understand the distinction between predominantly horizontal mounting tabs and predominantly vertical mounting tabs further directionality around the HUD provides a discussion framework. For example, the HUD housing 102 or the device or system 200 generally includes an attachment side of the HUD housing, wherein the attachment side is on a side of the HUD base 112 with the attachment slot. Further, the HUD housing 102 or the device or system 200 generally includes a below-region of the HUD housing defined by a region opposite the attachment side relative to the HUD base 112. FIG. 2 shows a mounting tab 202 that is a predominantly horizontal mounting tab. In an example, a mounting tab 202 may be a predominantly horizontal mounting tab if the majority of the mounting tab is in the attachment side compared to the below-region when the mounting tab is installed in the attachment slot. The horizontal mounting tab may include a first portion that projects horizontally from the sidewall of the HUD and the first portion does not cross a base plane of the HUD base 112. In an example, a predominantly horizontal mounting tab is considered predominantly horizontal if a fastener direction of a fastener to be inserted into the mounting tab is closer to perpendicular rather than parallel when compared to a normal line drawn from the sidewall of the HUD housing 102 at an edge of the attachment slot 110. The predominantly horizontal mounting tab may include a fastener opening with a fastener direction for a fastener to be inserted into the mounting tab through the fastener opening, wherein the fastener direction is closer to perpendicular rather than parallel when compared to a normal line drawn from the HUD housing at any edge of the attachment slot.

When referring to a majority of the mounting tab, this can be referring to a majority of mass, a majority of volume, a majority of physical surface area, a majority of visible surface area, a majority of fastener openings, a majority of locations for fastener engagement with the mounting tab. For a contrasting view of mounting tabs, FIG. 3 shows, in part, an example of predominantly vertical mounting tabs and the associated attachment slot.

Figure 3:
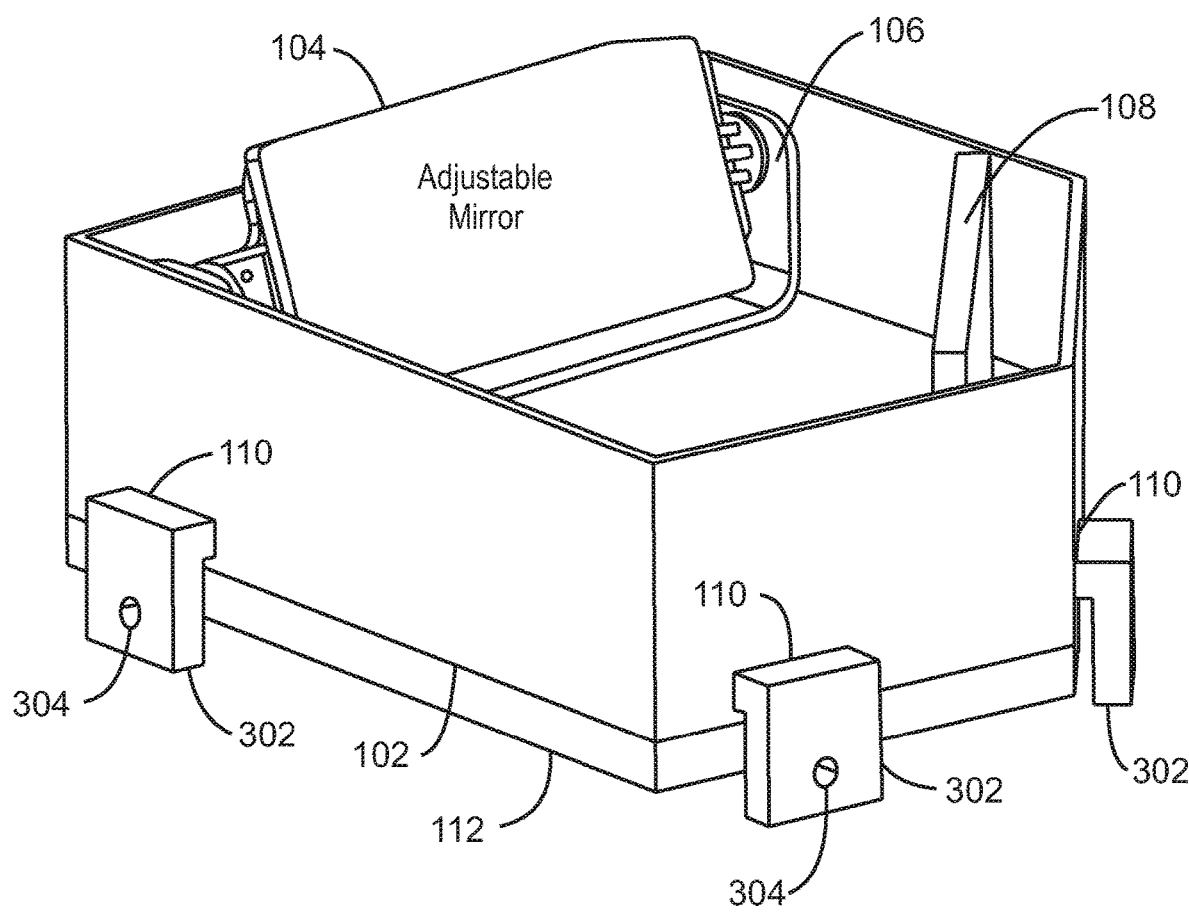
FIG. 3 is a block diagram of an example system for guiding light towards a user with a second set of mounting tabs.

FIG. 3 is a block diagram of an example system for guiding light towards a user with a second set of mounting tabs. Like numbered items are as described with respect to FIG. 1.

The attachment slot 110 is shown here with a mounting tab 302 that is a vertical mounting tab. As discussed with respect to FIG. 2, the relative directions and regions around the HUD housing 102 aid in discussion. Using the same orientations and regions described with respect to FIG. 2, a mounting tab may be a predominantly vertical mounting tab if the majority of the mounting tab is in the below-region compared to the attachment side when the mounting tab is installed in the attachment slot. The predominantly vertical mounting tab may include a first portion that projects horizontally from the sidewall of the HUD and a second portion that extends parallel to the sidewall of the HUD below a base plane of the HUD base 112, wherein the second portion is longer than the first portion. In an example, the mounting tab 302 may be considered predominantly vertical if a fastener direction of a fastener to be inserted into the mounting tab is closer to parallel rather than perpendicular when compared to a normal line drawn from the side wall of the HUD housing at any edge of the attachment slot 110. The predominantly vertical mounting tab may include a fastener opening with a fastener direction for a fastener to be inserted into the mounting tab through the fastener opening, wherein the fastener direction is closer to parallel rather than perpendicular when compared to a normal line drawn from the HUD housing at any edge of the attachment slot.

Further, with regard to vertical mounting tab, the fastener may be fastening to a component that is below the HUD housing 102. In this example, the vertical length of the mounting tab 302 will be at least as long as the distance to the bottom of the HUD housing 102 plus the height or diameter of the fastener. In this way, a fastener inserted into the fastener opening 304 may not hit or intersect with the HUD housing 102 itself.

Figure 4:
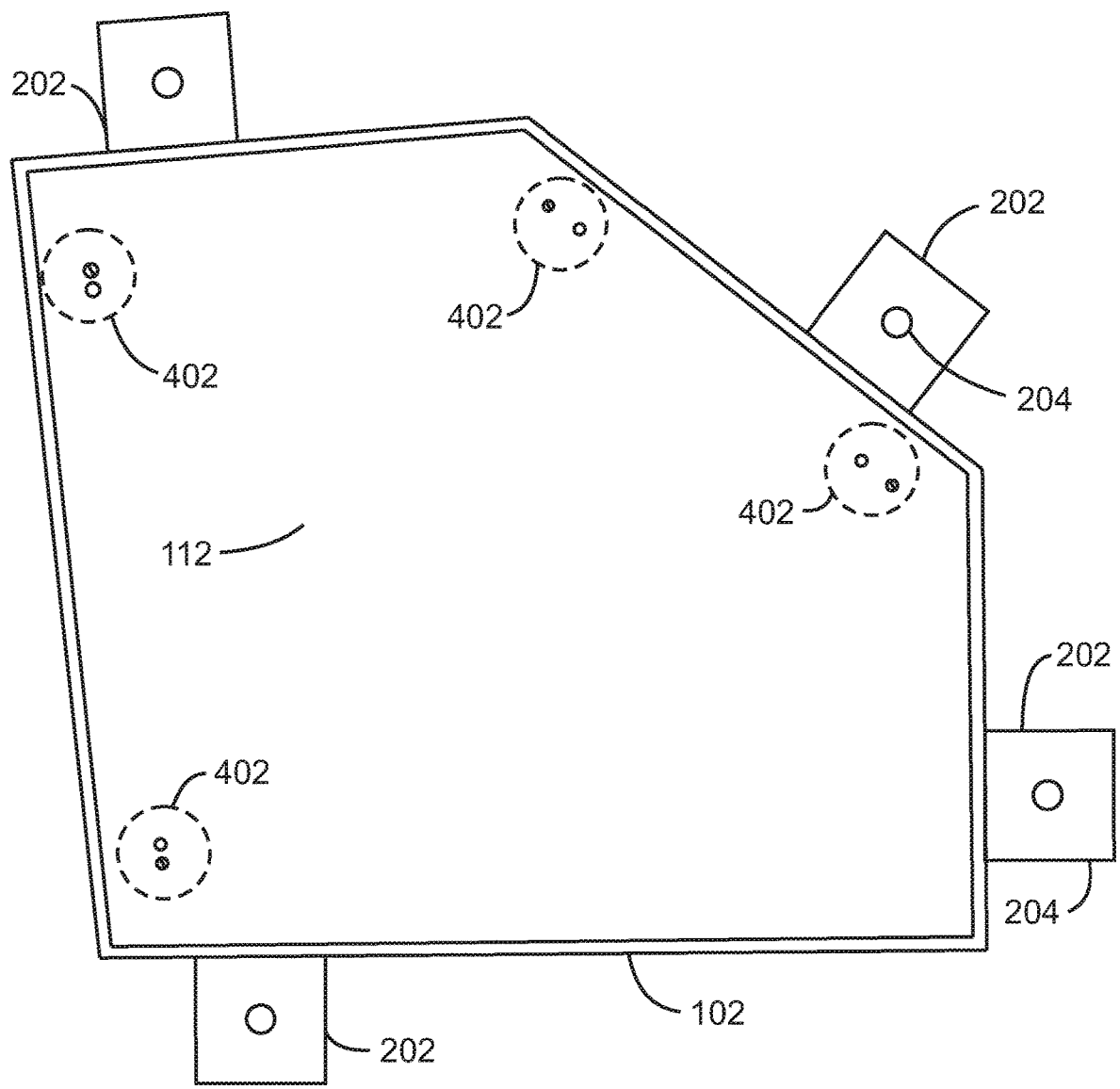
FIG. 4 is a block diagram of a top view of an example system for guiding light towards a user.

FIG. 4 is a block diagram of a top view of an example system for guiding light towards a user 400. Like numbered items are a discussed above with respect to FIGS. 1 and 2.

As FIG. 4 shows a top view of the HUD housing 102. The vantage of FIG. 4 shows the location where the adjustable mirror 104 and stationary mirror 108 are typically located. In FIG. 4, these components are not shown and instead the mirror mounts 402 are shown instead. There are a number of mirror mounts 402 shown and in this example, there are two attachment points in each mirror mount 402 and two mirror mounts for each previously present mirror, i.e. the adjustable mirror 104 and the stationary mirror 108. Accordingly, FIG. 4 shows four mirror mounts each having two attachment points. As further shown in FIG. 5, each mirror mount 402 may include a number of attachment points, where each attachment point may be a protrusion on the surface of the HUD housing or a recession that recedes from the surface of the HUD housing.

FIG. 4 additionally shows the location of the mounting tabs 202 relative to the HUD housing 102. In an example, the mounting tabs 202 do not penetrate the full wall of the HUD housing 102 and so cannot be seen on the inside of the HUD housing 102 from the view from above. In other embodiments, the attachments slots 110 may be located offset from the location of the mirror mounts 402 so that an inserted mounting tab would not intersect with either the mirror mounts 402 or a fully installed mirror. While the term mirror mount is used here, the mirror mounts 402 shown can refer to mounts for the stationary mirror 108 or the adjustable mirror 104. In an example, an attachment slot 110 is located in the HUD housing 102 so that it is offset from a mirror mount 402 and the adjustable mirror mount 402 such that a normal line drawn from the sidewall of the HUD housing at any edge of the attachment slot would not intersect with the stationary mirror mount or the adjustable mirror mount.

Figure 5:
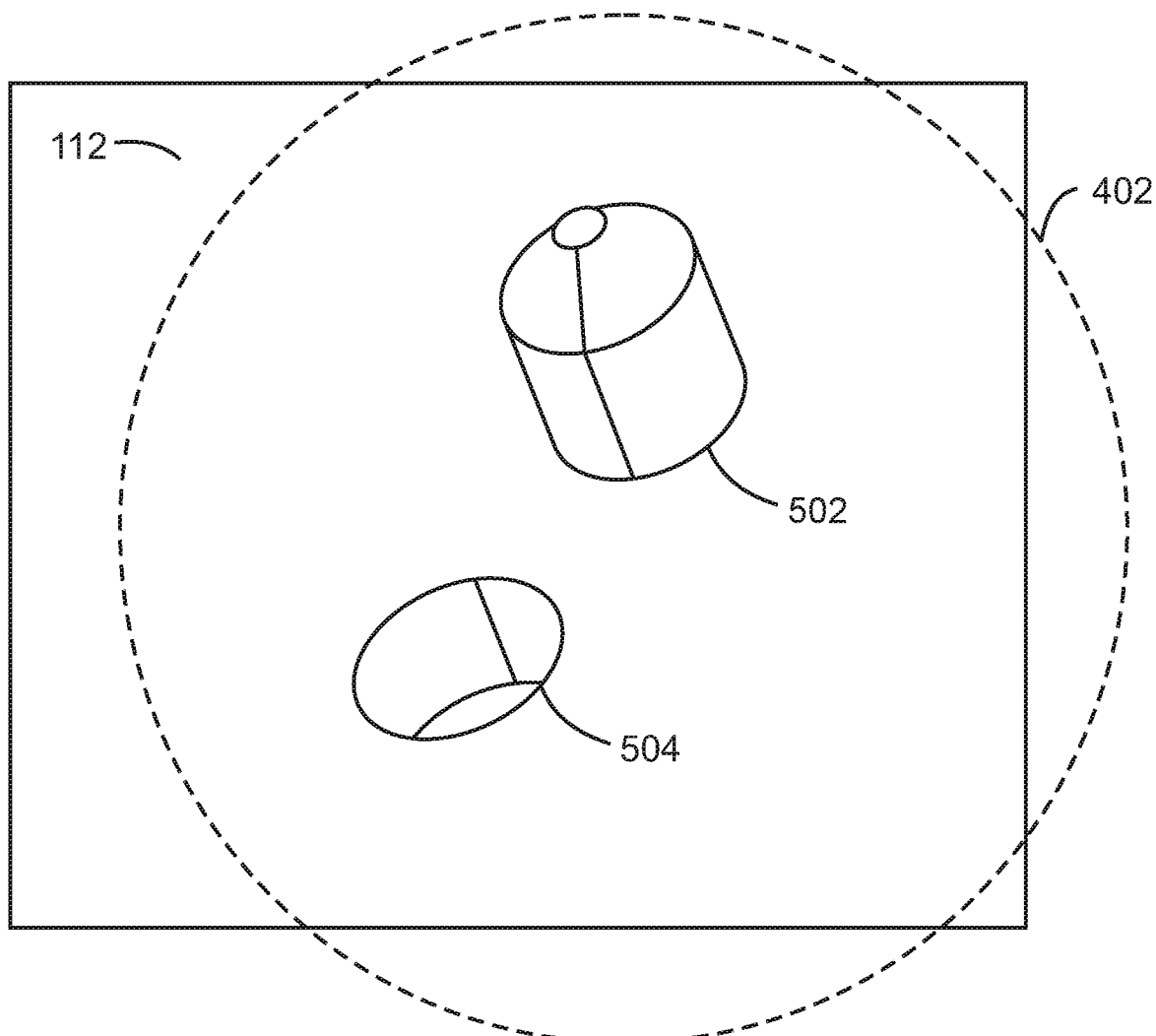
FIG. 5 is a block diagram of a detail for an example system for guiding light towards a user.

FIG. 5 is a block diagram of a detail for an example system for guiding light towards a user. Like numbered items are as described above with respect to FIG. 4. As discussed above, each mirror mount 402 can include attachment points such as an attachment point protrusion 502 or and an attachment point recession 504. Each mirror mount 402 may include at least one attachment point. In an example, the mirror mount 402 has a number of attachment points. The attachment point protrusion 502 of the mirror mount 402 may have a conic shaped end the smaller end of the conic shaped end being distal to the HUD housing. This conic end may aid in installing the mirror onto the mirror mount as it acts as a guide to steer the mirror mount onto the protrusion. Further, the conic shape aids in centering the mirror on the attachment point as the expanding radial shape ensures that there is a snug fit that is centered relative to the rest of the attachment point protrusion. Similarly, the attachment point recession 504 may enable a protrusion on the mirror to be inserted into it, thereby securing the mirror to the HUD housing 102. Similarly, the recession may have a conic shaped recess at the distal end of the attachment point recession. For similar reasons, this conic shape may guide and center a mirror into a desired, centered, and snug position on the mirror mount.

Figure 6:
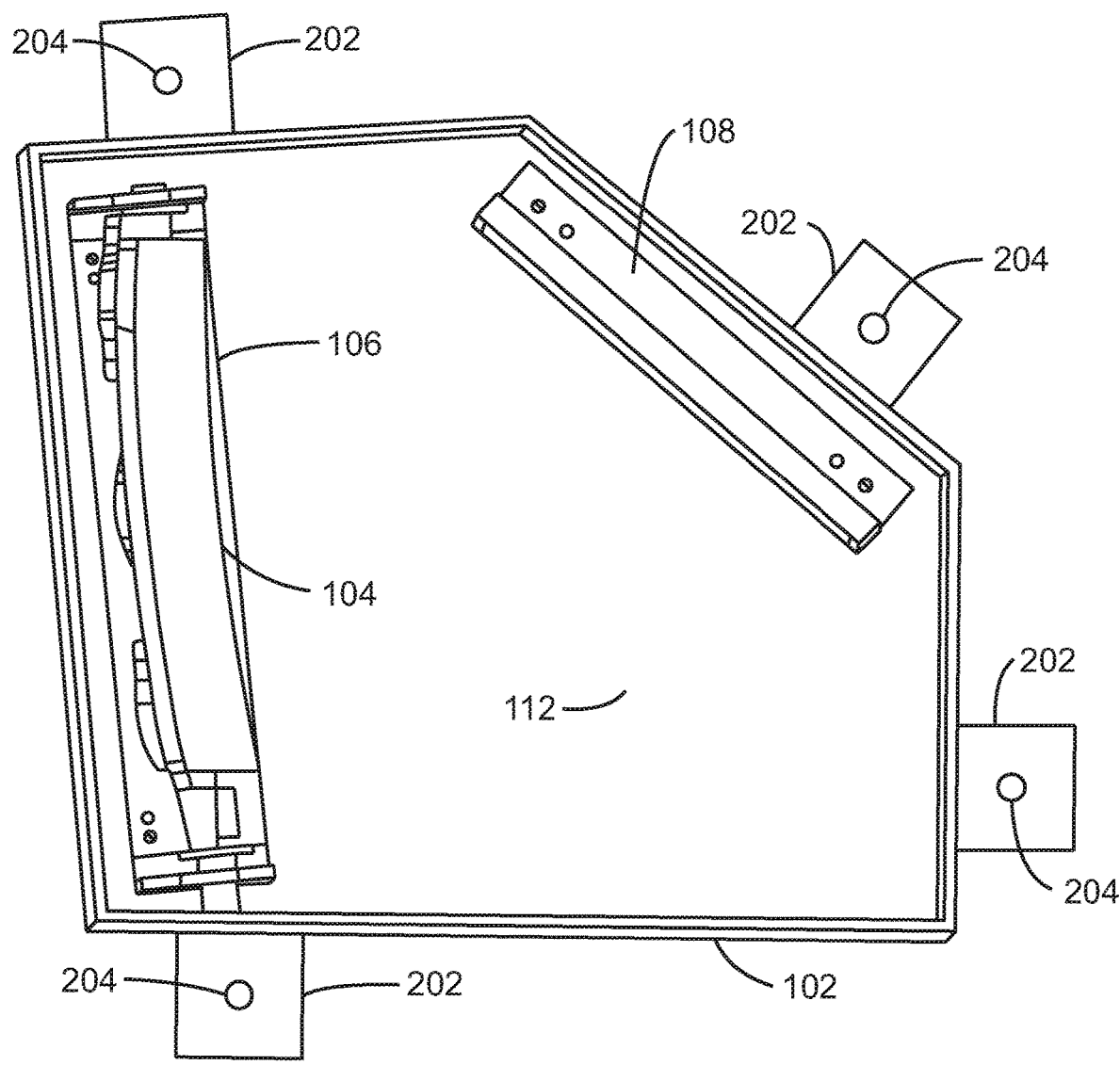
FIG. 6 is block diagram of a top view of an example system for guiding light towards a user with a first set of mounting tabs.

FIG. 6 is block diagram of a top view of an example system 600 for guiding light towards a user with a first set of mounting tabs. Like numbered items are as described with respect to FIGS. 1 and 2. In this figure the predominantly horizontal mounting tabs are used.

FIG. 6 shows a system 600 for use in a vehicle to guide light towards a user including a heads up display (HUD) housing 102 with a HUD base 112. The system further includes a stationary mirror mount on the HUD base 112 of the HUD housing 102 and an adjustable mirror mount on the HUD base 112 in the HUD housing 102. The HUD housing 102 may also include an attachment slot 110 in the HUD housing 102, where the attachment slot 110 is to accept a mounting tab 202. The attachment slot 110 may be shaped to accept both of either a predominantly vertical mounting tab or a predominantly horizontal mounting tab. The system accordingly also includes either the predominantly vertical mounting tab or the predominantly horizontal mounting tab.

In an example, the system 600 includes an attachment slot that is located to be offset from the stationary mirror mount and the adjustable mirror mount such that a normal line drawn from the HUD housing 102 at any edge of the attachment slot 110 would not intersect with the stationary mirror mount or the adjustable mirror mount. In an example, the stationary mirror mount includes at least one of a protrusion on the surface of the HUD housing and a recession that recedes from the surface of the HUD housing. The stationary mirror mount may be a protrusion with a conic shaped end the smaller end of the conic shaped end being distal to the HUD housing.

The system 600 can include an attachment side of the HUD housing 102, wherein the attachment side is on a side of the HUD base 112 with the attachment slot. This example system may also include a below-region of the HUD housing 102 defined by a region opposite the attachment side relative to the HUD base 112. The predominantly vertical mounting tab is considered predominantly vertical if the majority of the mounting tab is in the below-region compared to the attachment side when the mounting tab is installed in the attachment slot. By contrast, the predominantly horizontal mounting tab is considered predominantly horizontal if the majority of the mounting tab is in the attachment side compared to the below-region when the mounting tab is installed in the attachment slot.

In an example of this system, the predominantly horizontal mounting tab is considered predominantly horizontal if a fastener direction of a fastener to be inserted into the mounting tab is closer to perpendicular rather than parallel when compared to a normal line drawn from the sidewall of the HUD housing at any edge of the attachment slot. Furthermore, the predominantly vertical mounting tab is considered predominantly vertical if a fastener direction of a fastener to be inserted into the mounting tab is closer to parallel rather than perpendicular when compared to a normal line drawn from the sidewall of the HUD housing at any edge of the attachment slot.

What is claimed is:

1. A heads up display (HUD) to guide light towards a user in a vehicle, the HUD comprising:
    a (HUD) housing with a base plane;
    a stationary mirror mount on the HUD base;
    an adjustable mirror mount on the HUD base; and
    an attachment slot disposed in the HUD housing, the attachment slot to accept a mounting tab, wherein the attachment slot is shaped to accept either one of a predominantly vertical mounting tab and a predominantly horizontal mounting tab, wherein the predominantly vertical mounting tab comprises:
        a first portion that projects horizontally from a sidewall of the HUD, wherein the first portion comprises a first end inserted into the attachment slot and a second end opposite the first end; and
        a second portion coupled perpendicularly to the second end of the first portion, wherein the second end extends parallel to the sidewall of the HUD below a base plane of the HUD base, wherein the second portion is longer than the first portion.

2. The device of claim 1, wherein the attachment slot is located to be offset from the stationary mirror mount and the adjustable mirror mount such that a normal line drawn from the HUD housing at any edge of the attachment slot would not intersect with the stationary mirror mount or the adjustable mirror mount.

3. The device of claim 1, wherein the stationary mirror mount comprises at least one of a protrusion on the surface of the HUD housing and a recession that recedes from the surface of the HUD housing.

4. The device of claim 1, wherein the adjustable mirror mount comprises at least one of a protrusion on the surface of the HUD housing and a recession that recedes from the surface of the HUD housing.

5. The device of claim 1, wherein the stationary mirror mount is a protrusion with a conic shaped end the smaller end of the conic shaped end being distal to the HUD housing.

6. The device of claim 1, comprising:
    an attachment side of the HUD housing, wherein the attachment side is on a side of the HUD base with the attachment slot; and
    a below-region of the HUD housing defined by a region opposite the attachment side relative to the HUD base.

7. The system of claim 1, wherein the predominantly vertical mounting tab comprises a fastener opening with a fastener direction for a fastener to be inserted into the mounting tab through the fastener opening, wherein the fastener direction is closer to parallel rather than perpendicular when compared to a normal line drawn from the HUD housing at any edge of the attachment slot.

8. A system for use in a vehicle to guide light towards a user comprising:
    a heads up display (HUD) housing with a HUD base;
    a stationary mirror mount on the HUD base the HUD housing;
    a stationary mirror mounted on the stationary mirror mount;
    an adjustable mirror mount on the HUD base in the HUD housing;
    an adjustable mirror mounted on the adjustable mirror mount;
    an attachment slot in the HUD housing, the attachment slot to accept a mounting tab, wherein the attachment slot is shaped to accept either one of a predominantly vertical mounting tab and a predominantly horizontal mounting tab; and
    either the predominantly vertical mounting tab or the predominantly horizontal mounting tab, wherein the predominantly vertical mounting tab comprises:
        a first portion that projects horizontally from a sidewall of the HUD, wherein the first portion comprises a first end inserted into the attachment slot and a second end opposite the first end; and
        a second portion coupled perpendicularly to the second end of the first portion, wherein the second end extends parallel to the sidewall of the HUD below a base plane of the HUD base, wherein the second portion is longer than the first portion.

9. The system of claim 8, wherein the attachment slot is located to be offset from the stationary mirror mount and the adjustable mirror mount such that a normal line drawn from the HUD housing at any edge of the attachment slot would not intersect with the stationary mirror mount or the adjustable mirror mount.

10. The system of claim 8, wherein the stationary mirror mount comprises at least one of a protrusion on the surface of the HUD housing and a recession that recedes from the surface of the HUD housing.

11. The system of claim 8, wherein the adjustable mirror mount comprises at least one of a protrusion on the surface of the HUD housing and a recession that recedes from the surface of the HUD housing.

12. The system of claim 8, wherein the stationary mirror mount is a protrusion with a conic shaped end the smaller end of the conic shaped end being distal to the HUD housing.

13. The system of claim 8, comprising:
    an attachment side of the HUD housing, wherein the attachment side is on a side of the HUD base with the attachment slot; and
    a below-region of the HUD housing defined by a region opposite the attachment side relative to the HUD base.

14. The system of claim 8, wherein the predominantly vertical mounting tab comprises a fastener opening with a fastener direction for a fastener to be inserted into the mounting tab through the fastener opening, wherein the fastener direction is closer to parallel rather than perpendicular when compared to a normal line drawn from the HUD housing at any edge of the attachment slot.

* * * * *